May 2, 1967 W. S. CASTLE ETAL 3,316,717
DUAL FAN ENGINE
Filed Sept. 15, 1965
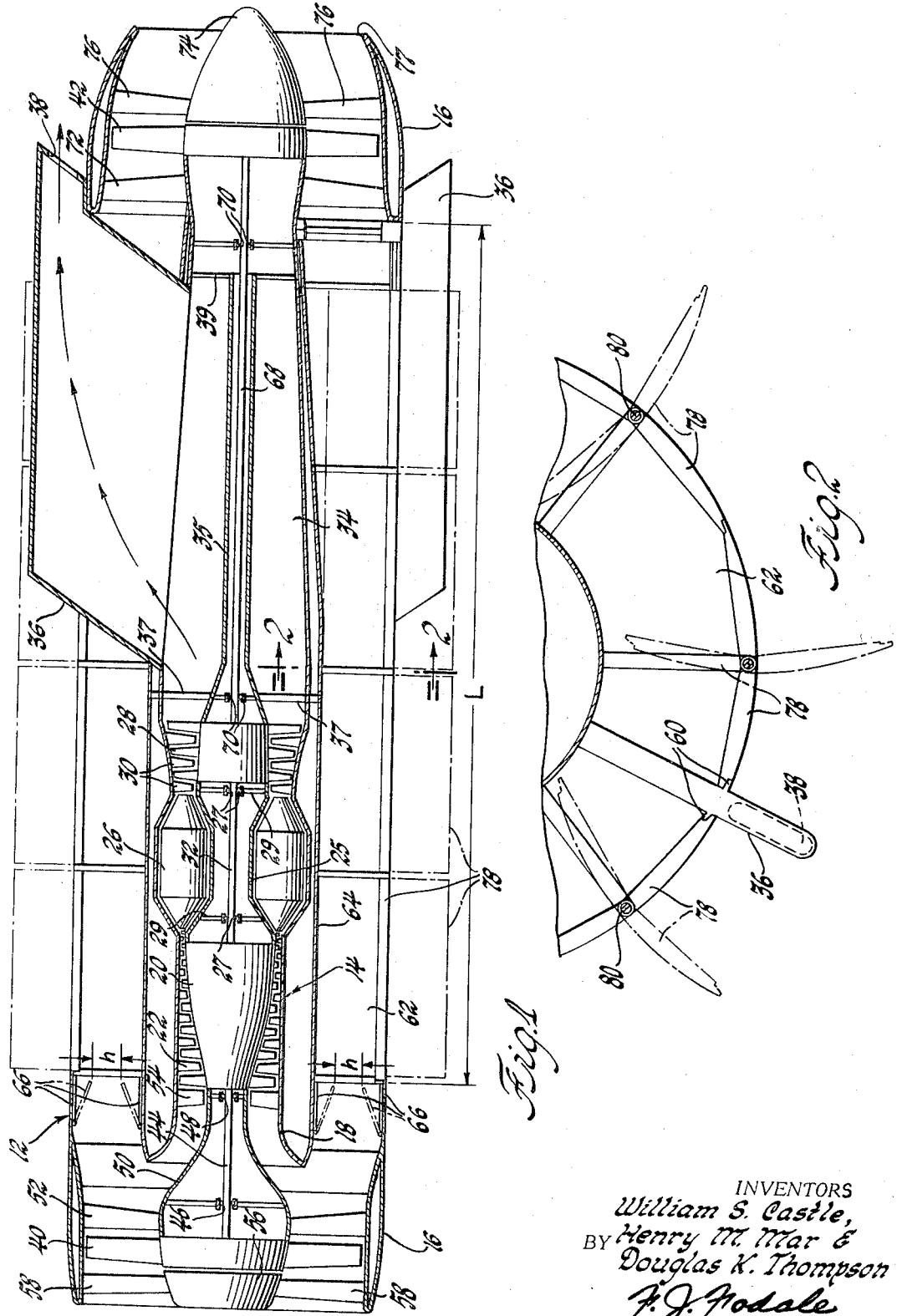
INVENTORS
William S. Castle,
Henry M. Mar &
BY Douglas K. Thompson
F. J. Fodale
ATTORNEY United States Patent Office 3,316,717
Patented May 2, 1967

3,316,717
DUAL FAN ENGINE
William S. Castle, Speedway, and Henry M. Mar and Douglas K. Thompson, Indianapolis, Ind., assignors to General Motors Corporation, Detroit, Mich., a corporation of Delaware
Filed Sept. 15, 1965, Ser. No. 487,369
5 Claims. (Cl. 60—226)

This invention relates generally to a gas turbine power plant and more particularly to a gas turbine power plant of the ducted fan type.

The ducted fan type gas turbine power plant generally comprises a conventional gas turbine power unit driving a ducted fan which in reality is a small propeller rotatably mounted in a shroud. As such, the characteristics of the ducted fan lie somewhere between those of the pure turbojet and the turboprop.

The turboprop on one hand takes practically all of the usable energy out of the combustion products with turbines which rotate a propeller to accelerate a larger amount of air a lesser amount. The latter or propeller producing thrust system is generally regarded as the more efficient; however, it is severely limited in two respects. First, it is desirable in all instances to have the propeller tip speeds remain subsonic. This puts a practical limit on the amount of thrust available from such a system. Secondly, in connection with the turboprop or the turbine driven propeller, matching of the propeller and engine speeds becomes a problem. A gas turbine engine to operate efficiently must operate at relatively high rotational speed. The only way to connect an efficient high speed engine with an efficient low speed propeller is through reduction gearing which is usually large, bulky, and adds undesired weight to the power unit.

The pure jet, on the other hand, while requiring no reduction gearing must accelerate a smaller amount of air a much larger amount. It produces thrust by accelerating air and discharging it in the form of a high velocity exhaust stream. This is felt to be a less efficient system. The answer hopefully lies in a ducted fan type of power plant which in a sense is a compromise engine. In the ducted fan, a portion of air is accelerated by fans which are analogous to the propeller thrust system. The remaining portion of the air is delivered to the gas turbine power unit as in the turboprop to provide shaft horsepower. The ratio of the air which is accelerated through the fans to the air which is delivered to the turbine is known as the bypass ratio. The higher the bypass ratio, the more closely the engine's performance characteristics approximate those of the turboprop which is best suited for medium altitudes and speeds. At lower bypass ratios, the ducted fan behaves more like the turbojet which is more efficient at higher altitudes where less air is available and at greater speeds.

Our invention is directed toward a ducted fan type of turbine engine having a variable bypass ratio. By this variable bypass capability, we can provide flexibility in our power plant so as to perform efficiently in two flight regimes. In the lower speed and/or medium altitude regime where characteristics of the turboprop are desired. we can increase the bypass ratio of our engine to approximate those desired characteristics of the turboprop. On the other hand, should we desire high altitude or faster flight, we can decrease this bypass ratio to change our power plant characteristics to those closer to that of the pure jet. Generally, we have accomplished this variable bypass feature by placing fans fore and aft of the gas turbine power unit. We can then operate the fans in series for a low bypass ratio or in parallel for a high bypass ratio.

Our engine gives us a secondary benefit even without its variable geometry. The high bypass parallel flow configuration has a bypass ratio which is high compared to other bypass engines of the same diameter. Or stated another way, our bypass engine has smaller diameter fans than bypass engines of the same ratio. This in turn permits us to have a power plant which requires less room and produces less drag. The smaller diameter fans can operate at higher rotational speeds so that we can couple the fans directly to the power output shaft or at worst require only simple reduction gearing. With these concepts in mind, reference is now made to the following specification taken in conjunction with the annexed sheet of drawings wherein:

FIGURE 1 is an elevation view partially in cross section of a variable bypass ratio ducted fan gas turbine engine in accordance with our invention.

FIGURE 2 is a section taken along the line 2—2 of FIGURE 1 and looking in the direction of the arrows.

Referring now to FIGURE 1, there is shown a ducted fan type gas turbine engine indicated generally at 12. The ducted fan gas turbine engine includes a gas turbine power unit indicated generally at 14 mounted within a long cylindrical duct 16. The gas turbine power unit 14 is a conventional gas turbine engine comprising an inlet 18, a multi-stage axial compressor 20 with vane rings 22 mounted between its stages, a combustor 26, and a multi-stage turbine rotor 28. Interstage stator rings 30 are provided between the stages of the turbine rotor 28. The rotor 28 is connected to the axial compressor 20 through the shaft 32 in the normal manner. The shaft 32 is protected from the combustor 26 by an annular shaft housing 25.

A number of bearings 27 supported in the shaft housing 25 rotatably support the shaft 32. The exhaust gases from the turbine 28 are exhausted into a closed cylindrical chamber 34 defined by the outer casing of the power unit and an integral exhaust bullet and shaft housing 35. The housing 35 is supported by struts 37 at its forward end and by a disc 39 at its aft end. The disc 39 also closes the downstream end of the chamber 34 to direct the exhaust gases radially outwardly from the chamber 34 through one or more circumferentially spaced hollow strutlike members 36. The strutlike members 36 terminate outside of the duct 16 and have openings 38 at their aft end through which the exhaust gases are discharged into the atmosphere.

As can be seen from FIGURE 1, the gas turbine power unit 14 is somewhat shorter in axial length than the duct 16. A fan 40 and a fan 42 are rotatably mounted at the forward and rear ends of the duct 16, respectively. The forward fan 40 is connected to the axial compressor 20 by a shaft 44 which is radially located by bearings 46 and 48. The bearings in turn are supported from structure carried by an annular housing 50 which in turn is supported by struts 52 extending from the duct 16 and by the inlet guide vane ring 54 of the gas turbine power unit 14. An inlet bell 56 centrally supported by struts 58 is provided at the inlet of the duct 16 ahead of the fan 40. While I have referred to the members 52 and 58 as struts, they could equally as well be guide vanes directing the air flow into and out of the front fan 40. The discharge from the forward fan 40 is divided between the gas turbine power unit inlet 18 and an annular passage 62 which is formed by the power unit outer casing 64 and the duct. Iris type gate valves 66 are provided at the inlet of the annular passage 62. These gate valves are movable between a fully opened position shown by the solid lines and a partially open position shown in phantom. The valves 66 give the inlet to the passage 62 a variable area capability or, stated another way, the forward fan 40 has a variable exhaust area capability.

The aft fan 42 is rotatably mounted in the duct 16 behind the gas turbine power unit 14. The aft fan 42 must be axially spaced downstream from the forward fan 40 at least five front fan nozzle heights. This distance is shown as L in FIGURE 1 with the thickness or radial height of the front fan exhaust nozzle as $h$. The nozzle height $h$ refers to the operative or minimum opening, that is, the phantom line position of the iris gate valves 66. Fan 42 is connected to the turbine 28 of the power unit 14 by a shaft 68 within the housing 35. A number of bearings 70 may be provided to radially fix the shaft 68. Ahead of the aft fan 42 are struts 72 which support the aft end of the power plant outer casing on the duct 16. Behind the aft fan 42, an exhaust bullet 74 is centrally supported in the duct 16 behind the aft fan 42 by a number of struts 76. As before, the members 72 and 76 may be guide vanes directing the air flow into and out of the aft fan 42. The exhaust bullet 74 is of such curvature so as to form a suitable exhaust nozzle 77 with the duct 16. As shown, the forward fan 40 and the aft fan 42 are directly connected to the power unit output by shafts 44 and 68, respectively. It is to be understood that while this is a desirable arrangement, it may be necessary in some designs to include reduction gearing between the power unit output and the fans to match the speeds of the gas turbine power unit 14 with the speed of the fans 40 and 42.

Returning our attention to the axial bypass passage 62, in general, and to the portion of the outer duct 16 which forms the outer wall for this passage, in particular, we see not a solid wall but rather a number of closures 78 pivotally mounted on their central axes 80. The closures 78 are rotatable between a closed circumferential position shown in solid lines and an open radial position shown in phantom. This is best illustrated in FIGURE 2. In our example, we have depicted four axially disposed sets of a number of circumferentially spaced rotatable closures 78. The circumferential ends of the closures 78 are oppositely tongued to overlap and abut each other in their closed position. This is true except, of course, in the area of the strutlike members 36 which extend through the duct 16. In this area, the closures' ends overlap and abut tongues 60 on the members 36. Means (not shown) are provided to simultaneously or selectively open and close the closures 78.

With the above description in mind, the operation of the design should be evident, however, it will now be described. When the closures 78 are closed and the iris gate valves 66 are in their fully open position, the ducted fan 12 is in its low bypass configuration. The positions of the movable parts in this configuration are shown in solid lines in both FIGURES 1 and 2. Air enters the inlet of the duct 16 and is compressed through the forward fan 40. A portion of the discharge air from the forward fan 40 enters the power unit inlet 18 and the remainder enters the inlet of the bypass passage 62. The valves 66 are fully open so that the inlet to the bypass passage 62 is at its greatest area. The air which entered the power unit 14 is compressed, mixed with fuel, burned, and expanded through the turbine 28 in the conventional manner. The exhaust gases from the turbine 28 flow into the chamber 34, and then radially outwardly through the strutlike members 36 and exhausted into the atmosphere through the openings 38. The turbine 28 is of the multi-stage type and is designed to take a major portion of the energy out of the gas stream. This energy in turn drives the compressor 20 and the forward and aft fans 40 and 42. In some designs, it may be possible that additional thrust is given to the ducted fan by the exhaust leaving openings 38.

In the meantime, the air which bypassed the power unit 14 and entered the annular bypass passage 62 flows downstream to the aft fan 42 where it is compressed a second time. In this manner, the fans 40 and 42 operate in series, that is, the same air is compressed twice, once by the forward fan 40 and once by the aft fan 42. During this type of operation, the aft fan receives air at an increased temperature which may somewhat degrade its performance; however, it the reduced performance is more than compensated for by the reduction in diameter of the fans.

Should an engine more efficient for slower speeds or lower altitudes be desired, the engine 12 is changed to its high bypass ratio configuration. To do this, the closures 78 are rotated to their open position which is shown in phantom in FIGURES 1 and 2. The iris type gate valves 66 are also moved to their phantom position to decrease and optimize the forward fan exhaust area. With the ducted fan in this high bypass configuration, the gas turbine power unit 14 operates as before to drive the forward and aft fans 40 and 42, respectively. The difference in operation of the engine comes from the open closures 78. Part of the bypass portion of the air which was compressed by the forward fan 40 is expanded through the nozzle 66 and passes out through the spaces in the duct 16 created by the open closures 78. The aft fan 42 receives air from the surrounding environment, compresses it and expands it through nozzle 77 to add to the thrust developed by the forward fan 40. As before in the low bypass configuration, there is a double compression of air; however, in the high bypass ratio configuration, the air from the forward fan 40 has been exhausted and air entering the aft fan 42 has been separately exhausted to provide two bypass flows. This increases the bypass ratio and causes the fans 40 and 42 to operate analogously to a pair of axially aligned spaced propellers. The characteristics of the engine 12 are now closer to those of the turboprop. Air entering the aft fan 42 consists of a mixture of fresh ambient air drawn in through the spaces between open doors 78 and a portion of the air exhausted by the forward fan nozzle 66. Spacing L between the forward fan nozzle 66 and the aft fan inlet 72 is sufficient to allow diffusion of the air accelerated through nozzle 66.

Thus, it can be seen that we have provided a ducted fan with a variable bypass ratio to provide engine flexibility; that is, an engine which has two different sets of characteristics, each set being efficient and desirable for a different flight regime.

Various modifications are contemplated and may obviously be resorted to by those skilled in the art without departing from the spirit and scope of the invention as hereinafter defined by the appended claims, as only a preferred embodiment thereof has been disclosed.

We claim:
1. In a variable ducted fan gas turbine engine or the like, the combination comprising:
   an elongated cylindrical duct,
   a gas turbine power unit mounted within said duct, said gas turbine power unit being shorter than said duct so that the inlet and exhaust of said power unit are spaced axially inwardly from the ends of said duct,
   an annular bypass passage defined by said duct and the outer casing of said power unit,
   variable area means in the inlet of said bypass passage,
   exhaust passage means extending from the exhaust of said gas turbine power unit to the outside of said duct through said bypass passage,
   a first fan rotatably mounted in said duct ahead of the inlet of said gas turbine power unit whereby the discharge of said fan is divided between said inlet and said bypass passage,
   a second fan rotatably mounted in said duct aft of said power unit,
   means to drivingly couple said fans to said power unit, and
   a plurality of pivotally mounted closures in the portion of said duct defining said bypass passage and downstream from said variable area means, said closures being movable between an open and closed position to vary the bypass ratio of said engine, said closure means in their open position providing communication from said bypass passage to the atmosphere through said duct.

2. The combination as described in claim 1 wherein said variable area means forms an annular exhaust nozzle means at its minimum radial height $h$ for said first fan and wherein said second fan is axially spaced from said first fan at least five times the greatest radial height $h$ of said annular exhaust nozzle.

3. In a variable ducted fan gas turbine engine or the like, the combination comprising:
   an elongated cylindrical duct,
   a gas turbine power unit mounted within said duct, said gas turbine power unit being shorter than said duct so that the inlet and exhaust of said power unit are spaced axially inwardly from the ends of said duct,
   an annular bypass passage defined by said duct and the outer casing of said power unit,
   exhaust passage means extending from the exhaust of said gas turbine power unit to the outside of said duct through said bypass passage,
   a first fan rotatably mounted in said duct ahead of the inlet of said gas turbine power unit whereby the discharge of said fan is divided between said inlet and said bypass passage,
   a second fan rotatably mounted in said duct aft of said power unit,
   means to drivingly couple said fans to said power unit, and
   closure means in the portion of said duct defining said bypass passage, said closure means being movable between an open and closed position to vary the bypass ratio of said engine, said closure means in its open position providing communication from said bypass passage to the atmosphere through said duct.

4. In a variable ducted fan engine or the like, the combination comprising:
   an elongated cylindrical duct,
   a power unit mounted within said duct, said power unit being shorter than said duct,
   an annular bypass passage defined by said duct and the outer casing of said power unit,
   variable area means in the inlet of said bypass passage,
   a first fan rotatably mounted in said duct ahead of said power unit,
   a second fan rotatably mounted in said duct aft of said power unit,
   means to drivingly couple said fans to said power unit, and
   closure means in the portion of said duct defining said bypass passage, said closure means being movable between an open and closed position to vary the bypass ratio of said engine, said closure means in its open position providing communication from said bypass passage to the atmosphere through said duct.

5. In a variable ducted fan gas turbine engine or the like, the combination comprising:
   an elongated cylindrical duct,
   a first fan rotatably mounted in said duct,
   a second fan rotatably mounted in said duct and axially spaced from said first fan,
   a power unit,
   means to drivingly couple said fans to said power unit, and
   closure means in the portion of said duct between said fans, said closure means being movable between an open and closed position, said closure means providing communication between said fan in its closed position and communication between said first fan and the atmosphere through said duct when in its open position.

References Cited by the Examiner

UNITED STATES PATENTS 2,930,190    3/1960    Rogers _____ 60—226

FOREIGN PATENTS 704,669    2/1954    Great Britain.
920,253    3/1963    Great Britain.
981,857    1/1965    Great Britain.

MARK NEWMAN, *Primary Examiner.*

D. HART, *Assistant Examiner.*